United States Patent [19]

Kim

[11] Patent Number: 5,713,647
[45] Date of Patent: Feb. 3, 1998

[54] EASILY ASSEMBLED AND DISASSEMBLED COMPUTER CASE

[75] Inventor: Young-joo Kim, Suwon, Rep. of Korea

[73] Assignee: SamSung Electronics Co., Ltd., Suwon, Rep. of Korea

[21] Appl. No.: 612,458

[22] Filed: Mar. 7, 1996

[30] Foreign Application Priority Data

Mar. 10, 1995 [KR] Rep. of Korea ............ 95-4965

[51] Int. Cl.⁶ .................................................. A47B 81/00
[52] U.S. Cl. .................. 312/223.2; 312/222; 312/290; 361/683; 361/726; 292/128
[58] Field of Search .......................... 312/222, 215, 312/223.1, 223.2, 293.2, 300, 290, 111, 265.6, 265; 220/334, 338, 342; 361/683, 724, 725, 726, 727; 292/8, 31, 128; 24/67.9, 563, 545

[56] References Cited

U.S. PATENT DOCUMENTS

| | | |
|---|---|---|
| 1,245,132 | 10/1917 | Tarshis . |
| 3,003,215 | 10/1961 | Fernberg .................. 24/563 X |
| 4,047,777 | 9/1977 | Pfeifer et al. ............. 312/265 X |
| 4,435,027 | 3/1984 | Prather et al. .............. 312/222 |
| 4,896,070 | 1/1990 | Reid et al. .............. 220/334 X |
| 4,909,579 | 3/1990 | Liu ......................... 312/290 X |
| 4,972,296 | 11/1990 | Chu ........................... 361/725 |
| 4,980,676 | 12/1990 | Nomura et al. . |
| 5,139,291 | 8/1992 | Schultz ....................... 292/42 |
| 5,295,742 | 3/1994 | Knutson ..................... 312/244 |
| 5,309,181 | 5/1994 | Ota et al. ................. 24/67.9 X |
| 5,333,097 | 7/1994 | Christensen et al. ........ 361/726 X |
| 5,397,179 | 3/1995 | Allen et al. .............. 312/223.2 |
| 5,446,618 | 8/1995 | Tetsuya et al. ............ 361/726 X |
| 5,465,191 | 11/1995 | Nomura et al. .............. 361/681 |
| 5,564,804 | 10/1996 | Gonzalez et al. .......... 312/223.2 |

*Primary Examiner*—Peter M. Cuomo
*Assistant Examiner*—James O. Hansen
*Attorney, Agent, or Firm*—R. E. Bushnell, Esq.

[57] ABSTRACT

A computer case is disclosed that allows a user to open and close the case without the use of special tools or screws. Instead, a user simply slides two sliders on the cover of the case towards each other and simply lifts up the front portion of the cover to gain access to the interior of the case. The slider is monolithically integrated to a latch. The latch contains two spaced-apart arms about a recess. One of the arms of the latch is arcuate so as to guide a portion of the base and a portion of a cover that are slightly separated into the recess so that both portions are mated snugly preventing inadvertent opening of the case. This snug mating can be accomplished by simply sliding a pair of slider in the proper directions. To disengage the cover from the base, the sliders are slid in the opposite directions releasing a portions of the base from contact with a portions of the cover. When the case is released, the front of the cover can be lifted up. A pair of hinges in the rear of the case allow the front of the case to be pivoted open while preventing the cover from being completely detached from the base.

18 Claims, 7 Drawing Sheets

5,713,647

EASILY ASSEMBLED AND DISASSEMBLED COMPUTER CASE

CROSS-REFERENCE TO RELATED APPLICATIONS

This application makes reference to, incorporates the same herein, and claims all benefits accruing under 35 U.S.C. §119 arising from an application for Computer Case Fastening Device Having Easy, Assemblability and Disassemblability earlier filed in the Korean Industrial Property Office on 10 Mar. 1995 and there duly assigned Ser. No. 4965/1995.

FIELD OF THE INVENTION

The present invention relates to a computer cover that can be opened but not separated from the base of the module, and, more particularly, to computer cases constructed with hinges used for pivoting the cover about the base and latches for engaging and disengaging the cover from the base.

BACKGROUND OF THE INVENTION

Typical designs for contemporary cases frequently use a spring loaded slider monolithically integrated with a latch located on both sides of the front of the cover to allow the front of the cover of a module to be lifted up and pivoted about hinges situated in the rear of the module. U.S. Pat. No. 1,245,132 for a Bag Fastening and Locking Mechanism to Tarshis, for example, shows a bag fastening and locking mechanism, with a pair of sliders are monolithically integrated with a pair of latches located at opposite ends of the top of the bag. When the latches are engaged with the catches, the bag is closed as the frames on either side of the bag are mated together. Absent the external application of force, springs bias the sliders and the latches to the engaged position so that the latch is engaged with a catch. In order to open the bag, a user must apply external force simultaneously to both sliders in a direction towards each other and opposite to the bias of the spring. This causes the latches to disengage from the catches. Simultaneous to the application of force, is required to be applied to both sliders before the user is free to separate the two frames on each side of the top of the bag and to then open the bag.

U.S. Pat. No. 5,465,191 for a Single Hand Operable Latch Mechanism for Hinged Container to Nomura uses a spring loaded hand operated latch mechanism for a hinged container such as a laptop computer. A pair of latches are connected to a pair of sliders that are biased to the locked or the engaged position. This sliding latch, although movable, is inseparable from the cover of the unit. The user is required to manually slide both sliders simultaneously in a direction opposite to the bias of the spring. This causes a latch to disengage itself from the base of the apparatus so that the user can lift the front of the cover off the base. A pair of hinges near the rear prevent the cover from being completely separated from the base but allow the user to pivot the front of the cover up about the rear of the apparatus.

U.S. Pat. No. 4,980,676 for a Electronic Apparatus with Keyboard to Nomura has a storage mechanism for a cover of a keyboard with a pair of sliders located on the cover in the front at opposite sides from each other. To open the cover, the user must simultaneously move the sliders in a direction away from the edge and toward one another. This releases a tab from a recess in the bottom portion of the cover. After the sliders have been slid towards one another, the user lifts the front of the cover and allows the cover to pivot relative to, but not separate from the bottom portion. A pivot mechanism keeps the cover from being separated from the keyboard but allows the cover to rotate about an axis running along the back where the cover joins the base.

U.S. Pat. No. 5,139,291 for a Flush Mount Tilt-Latch for a Sash Window and Method to Schultz shows a latch mechanism used to attach and release a pivotable sash window to and from a window frame. A pair of spring loaded sliders, mounted on opposite sides of the top of the window frame, allow the user to remove all but the pivoting lower portion of the window from the frame. The slider and a latch are integrated to form one monolithic piece. The spring biases the slider so that the latch engages with the master frame so that the window is not free to pivot away from the frame. A user who wishes to pivot the top of the window from the frame must apply external force to both sliders simultaneously by sliding both away from the frame and towards each other. As a result, the latch releases from the frame and the user may remove the top of the window from the frame by pivoting the top of the window about the bottom of the window still attached to the frame.

U.S. Pat. No. 5,295,742 for a Compartmented Container for Craft Tools and Material to Knutson provides a container for storing craft tools and materials in a container similar to an attache case. Fasteners must be slid apart by a user in order to cause a latch to be released from the base of the case and enable a user to open the case. The front portion of the top of the case pivots on hinges about the rear of the case while the bottom of the case remains in place.

I have noticed that none of these examples of the art listed contemplates means for providing a snug fit between the cove and the base of the case. Moreover, I have found that the art requires that a mechanical step of pinching together the cover and the base of a case for a computer while simultaneously endeavoring to operate the latching mechanism to close the case, a requirement that is both inconvenient and unwieldy.

SUMMARY OF THE INVENTION

It is therefore an object of the present invention to provide for an easily assembled and disassembled computer case with a cover that fits snugly to the base of the case.

It is also an object to provide for an easily assembled and disassembled computer case that eliminates the necessity for a step of manually pinching together the cover and the base of the case.

It is further an object to provide an easily assembled and disassembled computer case using a latch that contains or a recess to accommodate engaging portions of the cover and portions of the base.

It is still further an object to provide an easily assembled and disassembled computer case with a latch containing two arms spaced apart about a recess with the arms act as a cam against portions of the cover and the base that are inserted into the recess.

It is yet a further object to provide a latch for fastening a computer cover to a computer base by guiding portions of the cover and the base together by way of camming action into a slot formed between two spaced apart protruding arms of a latching mechanism.

These and other objects may be achieved with a computer case that contains a slider monolithically integrated to a latch. The latch contains two spaced-apart arms about a recess. One of the arms of the latch is arcuately profiled along its distal end so as to guide a portion of the base and a portion of a cover that are slightly separated into the recess so that both portions are mated snugly together, thereby preventing inadvertent opening of the case. This snug mating can be accomplished by simply sliding a pair of sliders in the proper directions. To disengage the cover from the base, the sliders are slid in the opposite directions, thereby releasing a portion of the base from contact with a portion of the cover. When the case is released, the front of the cover can be lifted into an open position. A pair of hinges in the rear of the case allow the front of the case to be pivoted open while preventing the cover from being completely detached from the base.

BRIEF DESCRIPTION OF THE DRAWINGS

A more complete appreciation of this inventory, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
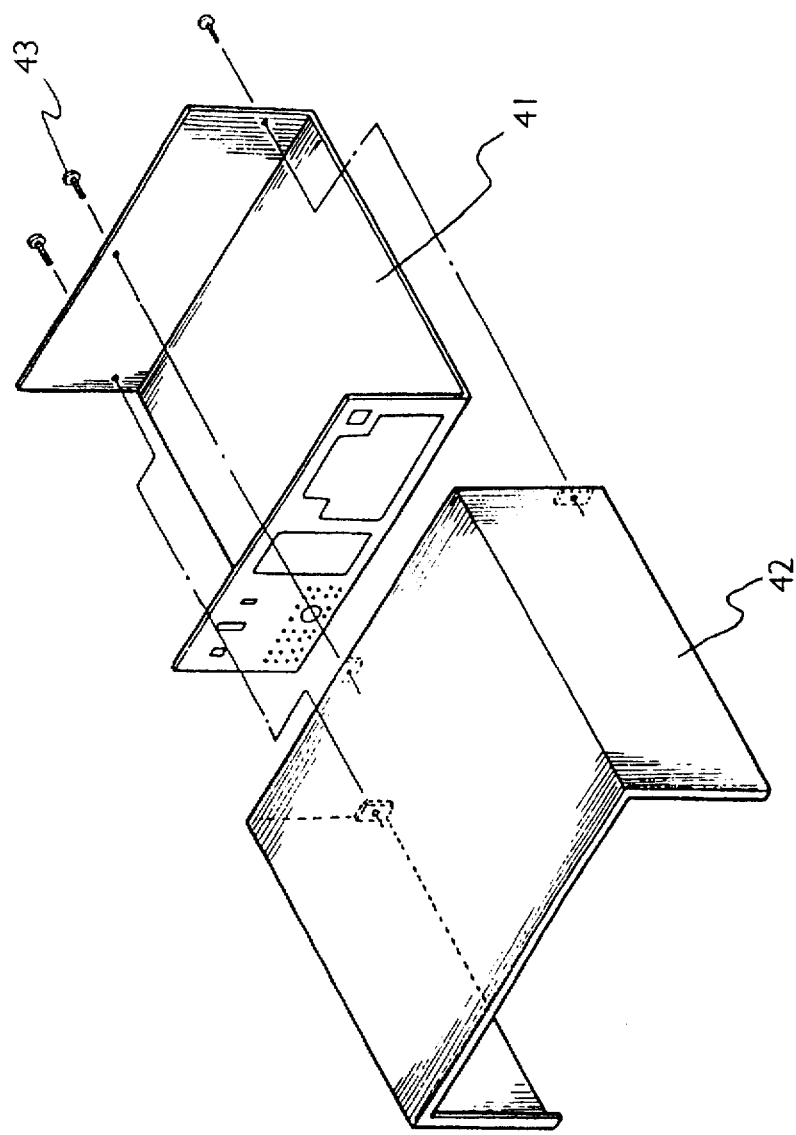
FIG. 1 is an exploded view of a conventional computer case.

Turning now to the drawings, FIG. 1 shows a typical computer case where screws 43 are used to fasten cover 42 to chassis 41. One or more tools are frequently required to serially and individually remove all of a plurality of small threaded fasteners before cover 42 may be removed and separated from chassis 41. All too often, one or more of these very small threaded fasteners are dropped or lost.

Figure 2:
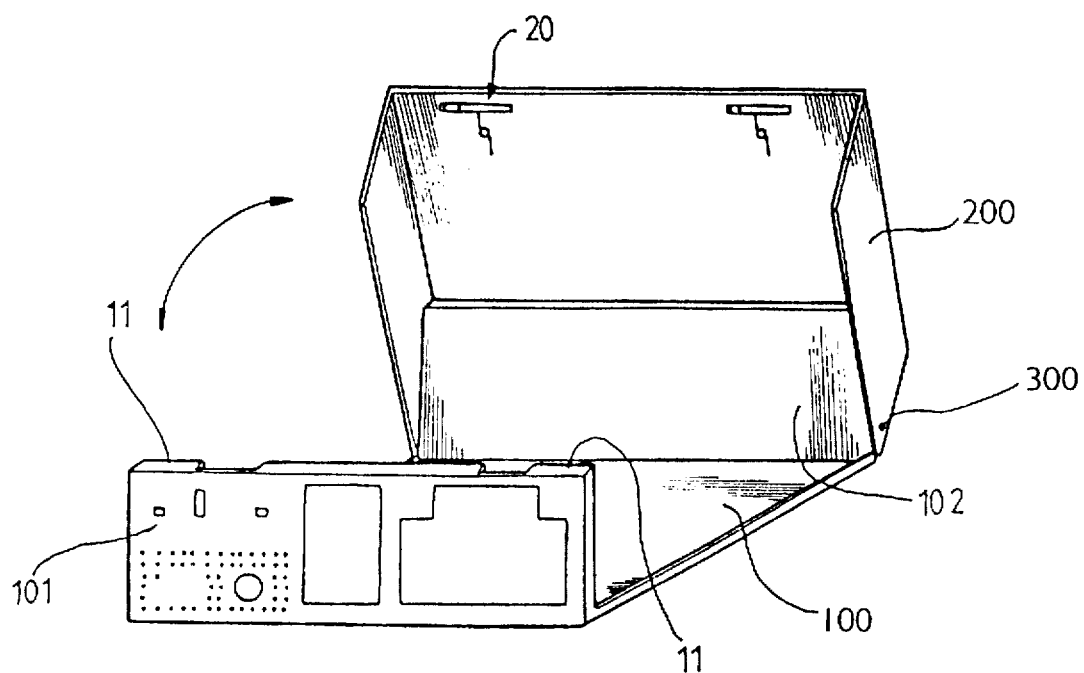
FIG. 2 is schematic perspective view illustrating the convenience and ease of assembly and a disassembly of a computer case constructed according to the principles of the present invention.

FIG. 2 is a schematic perspective view of the easily assembled and disassembled computer case constructed according to the principles of the present invention. The easily assembled and disassembled computer case according to the present invention includes a main chassis 100 with engaging projections 11 formed at right angles to front panel 101, holes 12 formed in rear panel 102 for inserting hinges 300, cover 200 with hinges 300 projected from lower ends of both sides of what to be pivotally connected to main chassis 100, locking sections 20 formed on upper ends of both sides thereof to make the cover secured to engaging projections 11 of main chassis 100, and resilient spring 24 for securing latch 20 to cover 200 by utilizing supporting mechanism 23.

Figure 4:
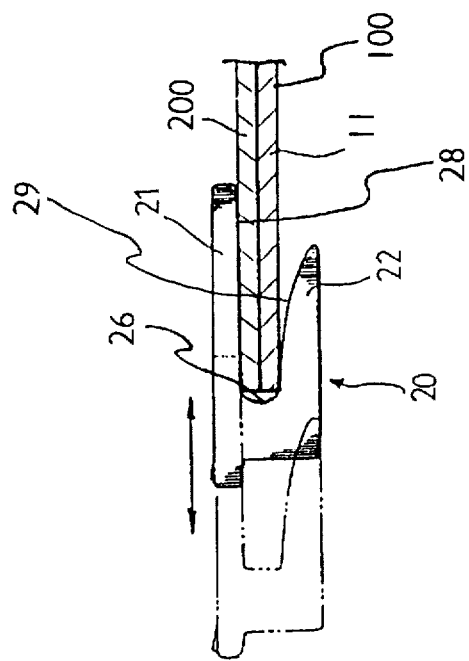
FIG. 4 shows the latching member engaged with portions of the base and the cover.
Figure 3:
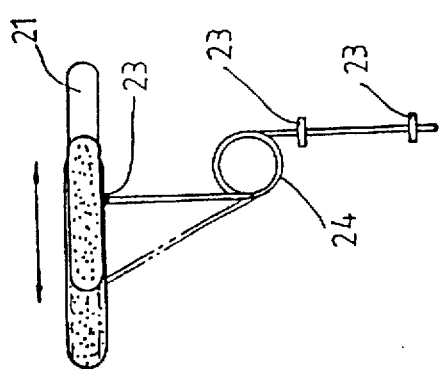
FIG. 3 shows the spring assembly interacting with and biasing the latch.

As shown in FIGS. 3 and 4, latch 20 respectively formed at upper ends of cover 200 include slider 21 as the first of two spaced apart arms, engaging protuberance 22 as the second of two spaced apart arms, recess or open slot 26 formed between slider 21 and engaging protuberance 22, arcuate engaging surface 29 forming the engaging surface of engaging protuberance 22, and flat engaging surface 28 on the engaging side of slider 21. Arcuate engaging surface 29 has a varying radii of curvature along the engaging surface. Thus, slider 21 and engaging protuberance 22 are formed about recess 26.

Figure 7:
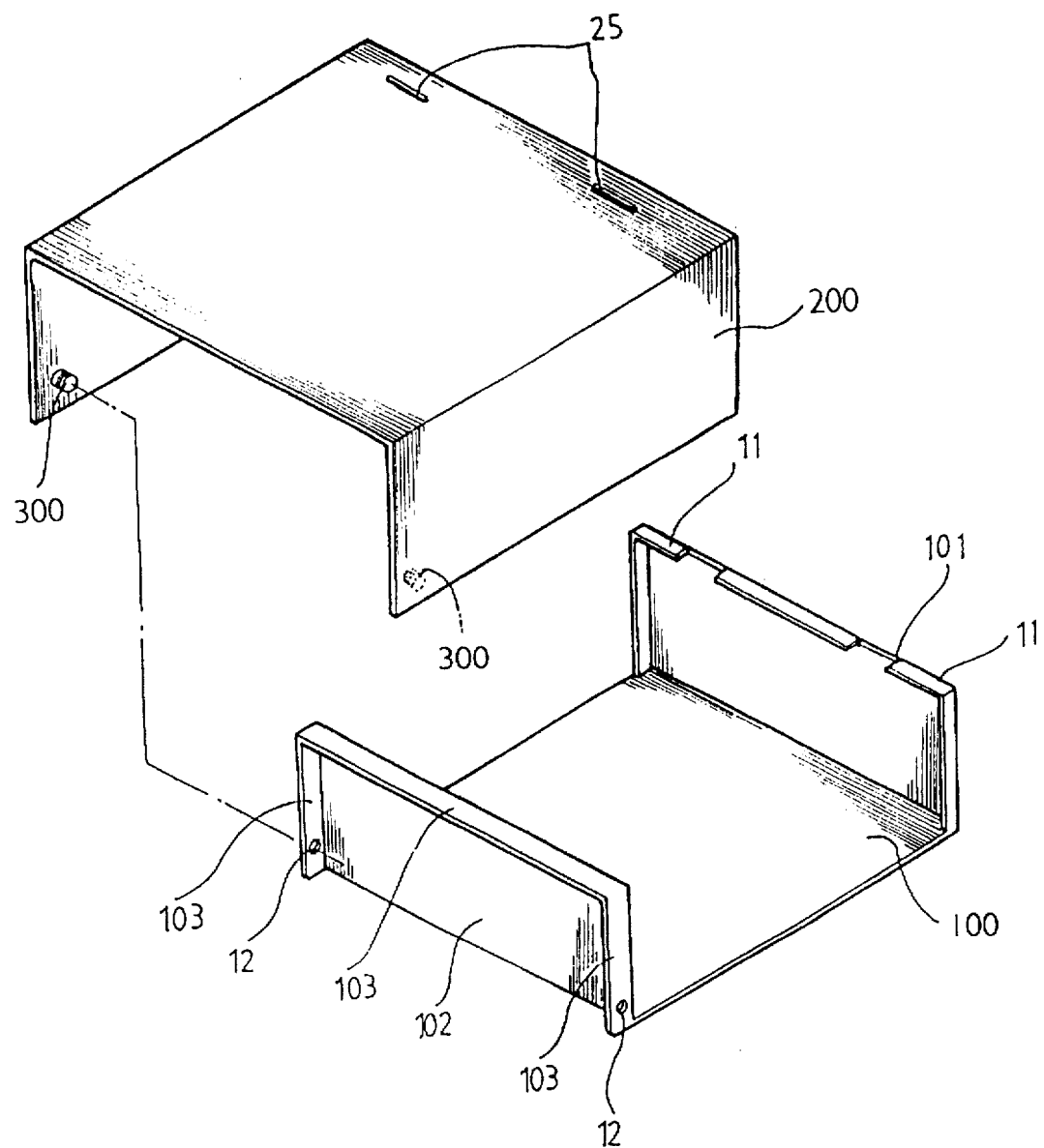
FIG. 7 is an exploded perspective view of the easily assembled and disassembled computer case according to the present invention.
Figure 9:
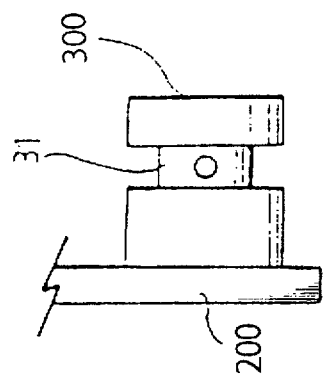
FIG. 9 is a front elevational view showing the structure of a hinge.
Figure 8:
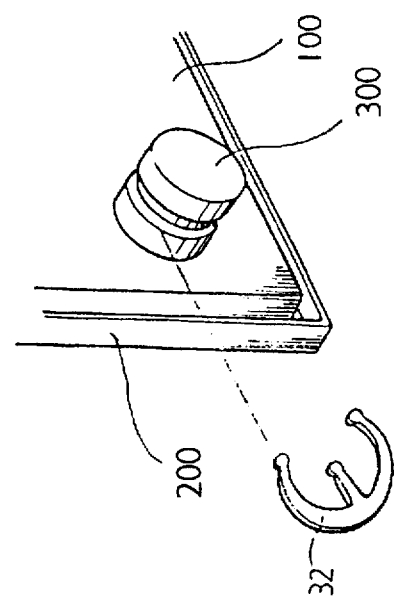
FIG. 8 is a perspective view illustrating the operation of the hinges according to the present invention.

One embodiment of the present invention as described above operates in the following manner. FIG. 7 shows rear panel 102 of main chasms 100 has holes 12, and has projection 103 for assisting a safe fastening. First the hinges 300 are inserted into the holes 12 of the main chassis 100 as shown in FIG. 8, and then, a fastening ring 32 is inserted into an annular groove 31 of hinge 300 as shown in FIG. 9, preventing the detachment of main chassis 100 from hinges 300. Thus cover 200 and main chassis 100 are connected through hinges 300, and assembling and disassembling of cover 200 can be carried out through pivotal movements of front of cover 200 about hinges 300 found in the rear of cover 200.

Figure 6:
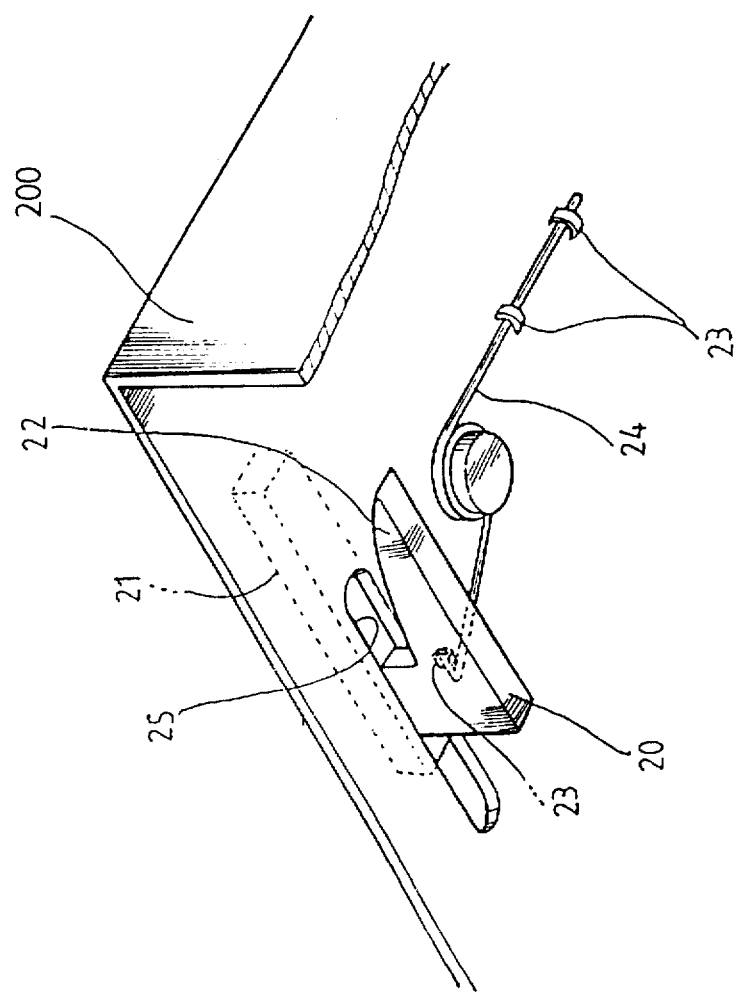
FIG. 6 is a perspective view of the locking part according to the present invention.

Referring now to FIGS. 2 and 6, the operation of latches 20 which are located in the upper ends of cover 200, will be described. As shown in FIG. 6, cover 200 is provided with a slider hole 25, so that slider part 21 of latch 20 can be moved to the left and the right. Latch 20 which is inserted into slider hole 25 is biased by the resilient force of spring 24 towards the edge of the case, away from the other slider. When computer cover 200 is in a state fastened to main chassis 100, cover 200 is squeezed against engaging projections 11 of main chassis 100 as shown in FIG. 4. By the help of resilient spring 24 which is installed between cover 200 and engaging protuberance 22 of latch 20, engaging projection 11 and cover 200 are inserted into recess 26 which is formed between slider part 21 and engaging protuberance 22. The result of this engagement is shown by solid lines in FIG. 4.

Therefore, main chassis 100 and computer cover 200 are securely fastened by latches 20 which are installed on the upper ends of the both sides of the front of computer cover 200.

External force must be applied simultaneously to both sliders to release cover 200 because the spring bias is resisted during disengagement. In order to open computer cover 200, slider parts 21 of latches 20 are moved towards each other, towards the center of the module, against the spring bias, moving latch 20 to a position as shown by the dotted lines in FIGS. 3 and 4. Owing to the pulling of resilient spring 24, a movement of slider part 21 is realized, and engaging protuberance 22 which is formed integrally with slider part 21 also moves. Therefore, in a state with cover 200 closed as shown by the solid lines in FIG. 4, latches 20 move as shown by the dotted lines in FIG. 4, with the result that the fastening of cover 200 to main chassis 100 is released. In this state, if the user lifts cover 200 upward, over 200 is separated from main chassis 100 as shown in FIG. 2 owing to the function of hinges 300.

Figure 5A:
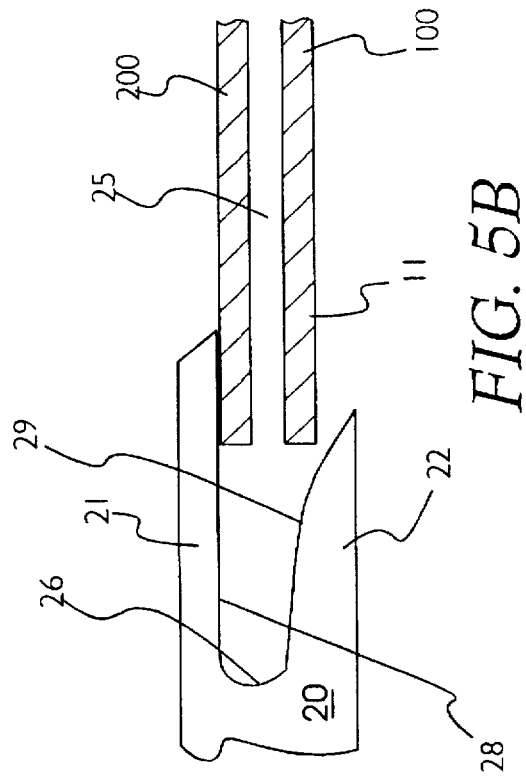
FIGS. 5A–D are time-lapsed illustrations showing the relative lateral and transverse movement of the latch engaging portions of the base and the cover.
Figure 5B:
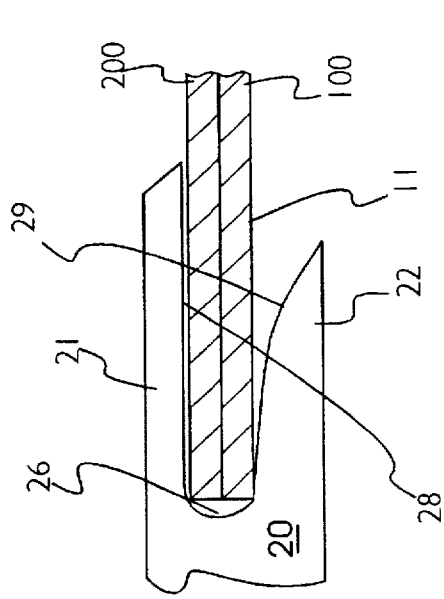
Figure 5C:
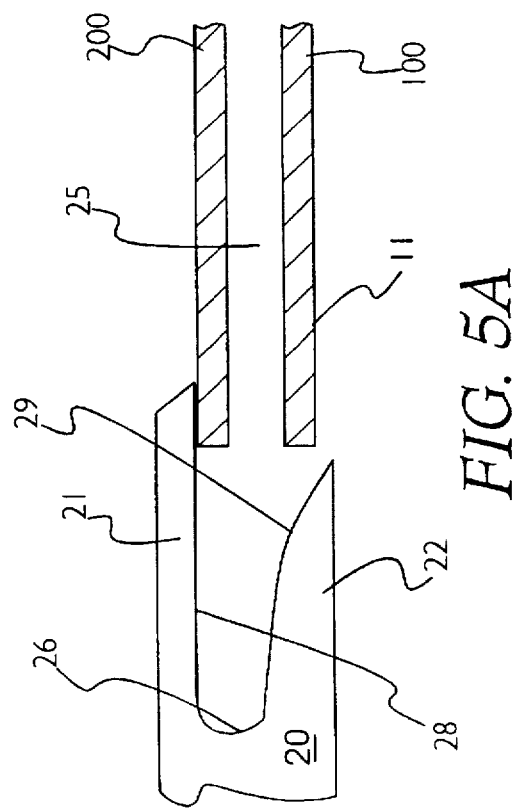
Figure 5D:
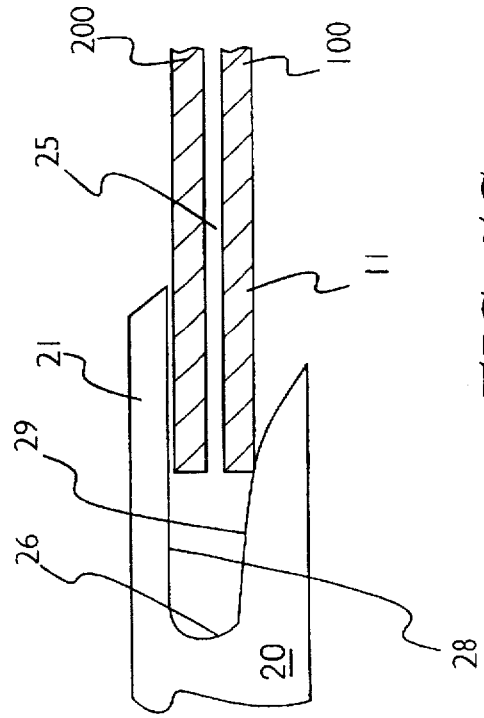

If the external physical force applied to slider parts 21 of latches 20 is removed, however, latches 20 return to the initial positions owing to the restoring force of the resilient spring 24 as shown by solid lines in FIGS. 3 and 4. If the opened cover 200 is to be closed, slider parts 21 of latches 20 are moved away from one another so as to put latches 20 in a released state. Then, the external physical force applied to slider parts 21 is removed so that recess 26 of latches 20 would have cover 200 and engaging projections 11 inserted into it owing to the restoring force of resilient spring 24, resulting in a secure fastening. FIGS. 5A–5D illustrate how the latch guides cover 200 and engaging projections 11 of chassis 100 into recess 26. FIG. 5A shows cover 200 and chassis 100, although still separated by a small gap 25, approaching recess 26 of latch 20. Small gap 25 still exists between cover 200 and chassis 100. When the sliders are moved from the disengaged position to the engaged position, arcuate engaging surface 29 of engaging protuberance 22 guides engaging projections 11 of chassis 100 towards 200 as shown in FIGS. 5B and 5C. In other words, the horizontal force by a user on latch 20 causes a vertical movement in engaging projections 11 of chassis project cause engaging projections 11 to mate with cover 200. Thus, the camming action caused by arcuate engaging surface 29 of engaging protuberance 22 of latch 20 assists the user in mating cover 100 to base 200, thus eliminating gap 25.

According to the principles of the present invention as described above, main chassis 100 and cover 200 of a computer system can be separated through a simple slider of a switch. During the separation of cover 200, cover 200 moves vertically owing to the function of hinges 300, and therefore, computer cover 200 can be separated even within a narrow space.

What is claimed is:

1. A computer case, comprising:
    a housing comprised of a cover and a base forming a substantially hollow enclosure when in mated and abutting juxtaposition;
    a plurality of discrete latches mounted on and disposed in sliding relation with opposing sides of a front portion of said cover, each of said plurality of discrete latches containing a pair of spaced apart arms formed about an open slot, each said pair of arms concurrently moving said cover and said base into said mated juxtaposition by engaging said cover and said base by sliding an open end of said slot towards spatial different coextensive adjacent edge portions of said cover and said base while drawing said edge portions together; and
    an inner surface of a first arm of each said pair of arms having an arcuate engaging surface along one side of said slot with a radius of curvature varying as a function of length of said first arm, each said first arm guiding said base into corresponding ones of said slot as said arcuate engaging surface travels while in with said edge portion of said base and inducing relative movement decreasing separation between said base and said cover while said latches slide relative to said cover.

2. The computer case of claim 1, further comprised of respective ones of said latches and respective ones of said pairs of arms being formed as single monolithic and unitary units.

3. The computer case of claim 1, further comprised of a pair of resilient springs biasing different corresponding ones of said latches toward engagement of said coextensive adjacent edge portions of said base and said cover and urging said two spaced apart arms of each of said latches to draw said coextensive adjacent edge portions into said mated and abutting juxtaposition.

4. The computer case of claim 1, further comprised of a pair of hinges rotatably coupling a front side of said cover to pivot about a back side of said base when said latches move said pair of slots to a position where said first arms are disengaged from said edge portions of said base.

5. The computer case of claim 1, comprising a length of each said first arm on each of said latches is greater than a distance between said pair of arms.

6. A computer case, comprising:
    a cover and a base forming a substantially hollow enclosure when engaged;
    a hinge, pivotably joining said base to said cover; and
    a plurality of discrete monolithic latching members, each mounted on and in a sliding relation with opposite sides on a front portion of said cover of said computer case, each of said latching members comprising a sliding portion and a latching portion, each said latching portion comprised of two parallely extending arms spaced apart by an intervening open recess oriented towards coextensive adjacent edges of said base and said cover, an inner surface of a first one of two said arms of said latching member having an arcuate profile of varying curvature, each pair of said parallely extending arms simultaneously engaging said base and said cover as each said latching portion slides towards corresponding ones of said adjacent edges while said first one of said arms of each said latching member guides said base into a corresponding said recess as each said arcuate profile comes into contact with corresponding ones of said edge of said base and gradually induces relative movement between said base and said cover, each said pair of arms of each said latching portion releasing said base from said cover as said latching members slide away from said corresponding adjacent edges and allow said front portion of said cover to be rotated about said hinge.

7. The computer case of claim 6, comprising a length of each said first arm on each of said latching members is greater than a distance between said parallely extending arms.

8. The computer case of claim 6, further comprising a pair of resilient springs where each said spring biases respective ones of said pair of latching members away from each other thus causing said base to engage with said cover.

9. A computer case, comprising:
    a housing comprised of a top cover and a bottom base;
    a pair of sliders slidably mounted on opposite sides of a front of said top cover of said computer case, each slider capable of engaging and disengaging said top cover to and from said bottom base by way of sliding an open end of a U-shaped piece towards and away from coinciding edges of two flat portions, a first of said two flat portions being a portion of said top cover situated on top of said other of a second flat portions, said second of said two flat portions being a portion of said bottom base allowing said U-shaped piece to engage and disengage said two flat portions from each other and
    a pair of elastic springs, each of said pair of elastic springs biasing respective ones of said pair of sliders to engage and sandwich said coinciding edges of said two flat portions together.

10. The computer case of claim 9, further comprising:
    a pair of hinges projecting from lower ends of both sides of said top cover and pivotally connected to said bottom base, said hinges allow the back side of said cover to about the back side of said bottom base when said top cover and said bottom base are detached in the front.

11. The computer case of claim 10, each one of said pair of hinges being comprised of a fastening ring inserted into a groove preventing the detachment of said top cover from said bottom base.

12. A computer case, comprising:

a housing comprised of a top cover and a bottom base;

a pair of sliders slidably mounted on opposite sides of a front of said top cover of said computer case, each slider capable of engaging and disengaging said top cover to and from said bottom base by way of sliding an open end of a U-shaped piece towards and away from coinciding edges of two flat portions, a first of said two flat portions being a portion of said top cover situated on top of said other of a second flat portions, said second of said two flat portions being a portion of said bottom base, allowing said U-shaped piece to engage and disengage said two flat portions from each other, each said U-shaped piece engaging said coinciding edges of said two flat portions by way of camming action and a pair of elastic springs, each of said pair of elastic springs biasing respective ones of said pair of sliders to engage and sandwich said coinciding edges of said two flat portions together.

13. The computer case of claim 12, further comprising:

a pair of hinges projecting from lower ends of both sides of said top cover and pivotally connected to said bottom base, said hinges allow the back side of said cover to pivot about the back side of said bottom base when said top cover and said bottom base are detached in the front.

14. A computer case, comprising:

a top cover;

a bottom base; and a pair of monolithic latching members, each located at opposite sides on a front of said top cover of said computer case, and each latching member comprising a sliding portion and a latching portion, each said latching portion comprised of two spaced apart arms pointed in a direction away from the other latching member, each pair of arms of each said latching member having a recess formed between said two anus pointed in a first direction, each pair of arms of each said latching member engaging a portion of said top cover with a portion of said bottom base when each one of said pair of latching members are slid in said direction away from said other, each said pair of arms of each one of said pair of latching members releases said top cover from said bottom base when moved in a direction towards said other latching member.

15. The computer case of claim 14, further comprising:

a pair of elastic springs, each of said pair of elastic springs biasing respective ones of said pair of latching members away from each other to engage said top cover to said bottom base.

16. The computer case of claim 14, further comprising said latching member engaging said portion of said top cover with said portion of said bottom base by way of camming action.

17. The computer case of claim 16, where one of said arms is arcuate enabling said top cover and said bottom base into to be guided into said latching position of said latching member.

18. The computer case of claim 17, further comprising:

a pair of elastic springs, each of said pair of elastic springs biasing respective ones of said pair of latching members away from each other, engaging said top cover with said portion of said bottom base.

* * * * *